US005617306A

United States Patent [19]
Lai et al.

[11] Patent Number: 5,617,306
[45] Date of Patent: Apr. 1, 1997

[54] ONE CYCLE CONTROL OF BIPOLAR SWITCHING POWER AMPLIFIERS

[75] Inventors: Zheren Lai; Keyue M. Smedley, both of Irvine, Calif.

[73] Assignee: The Regents of the University of California, Oakland, Calif.

[21] Appl. No.: 396,500

[22] Filed: Mar. 2, 1995

[51] Int. Cl.⁶ .................................................. H02M 3/335
[52] U.S. Cl. .............................. 363/17; 363/98; 363/132; 323/284
[58] Field of Search .................................. 363/16, 17, 22, 363/95, 97, 98, 131, 132; 323/282, 284, 349, 351

[56] References Cited

U.S. PATENT DOCUMENTS

| | | | |
|---|---|---|---|
| 3,659,184 | 4/1972 | Schwarz | 363/15 |
| 4,862,057 | 8/1989 | Contartese et al. | 323/285 |
| 4,947,309 | 8/1990 | Jonsson | 363/17 |
| 5,270,904 | 12/1993 | Gulcznski | 363/97 |
| 5,278,490 | 1/1994 | Smedley | 323/284 |

*Primary Examiner*—Peter S. Wong
*Assistant Examiner*—Adolf Berhane
*Attorney, Agent, or Firm*—Daniel L. Dawes

[57] ABSTRACT

A one cycle control for controlling DC-to-AC switching converters is achieved by forcing the average of a controlled switched variable to be exactly equal to the control reference in each switching cycle. Potential subharmonic oscillations in a switching power amplifier which occurs in the DC-to-AC application of this method is prevented by adding an offset voltage to the averaged controlled switched variable which is fed back and compared to a control reference, which compares and is then used to switch the switching power amplifier. Switching errors are corrected by resetting the integrator which averages the controlled switched variable and a time interval at least an order or magnitude less than the switching time of the switches in the switching power amplifier.

18 Claims, 4 Drawing Sheets

ONE CYCLE CONTROL OF BIPOLAR SWITCHING POWER AMPLIFIERS

BACKGROUND OF THE INVENTION

1. Field of the Invention

The invention relates to a control technique for DC-to-AC converters, and in particular to a method for controlling operation of DC-to-AC converters which operates for bipolar output, automatically compensates switching errors and excluding unstable operating conditions to overcome the inherent nonlinearity of switching power amplifiers, eliminating crossover distortion, rejecting power source ripple and achieving a broad dynamic range and wide bandwidth.

2. Description of the Prior Art

To date, most commercially available audio power amplifiers are configure to operate linearly. Therefore, they suffer from low efficiency and have a bulky volume. Conventional switching converters provide a high efficiency and low volume alternative for audio power amplification, but in turn, suffer from a low signal-to-noise ratio due to their inherent nonlinearity and crossover distortion.

One cycle control has been successfully used in DC-to-DC converters and has proven to have many advantages over other control methods. See K. Smedley et al., *"One-Cycle Control of Switching Converters,"* PESC Record 1991 at 1173–80 (IEEE Publication 92ch3163-3) and Smedley, *"One Cycle Controlled Switching Circuit,"* U.S. Pat. No. 5,278,490 (1994). This control technique uses an integration and reset method to force the switched variable to be exactly equal to the control reference in each switching cycle, regardless of the power source ripple and the switching error. It decouples the input and output stages of converter. Therefore, the system order is reduced, the perturbation from input stage to output stage is rejected, and the system dynamic response is very fast. The nonlinear switching converter behaves like a linear system. The generality of this control method has been confirmed by applying it to all types of DC-to-DC pulse width modulated or quasi-resonant converters for either voltage or current control.

However, what is needed is an extension of the one cycle control for DC-to-AC conversion with special attention to the specific requirements of audio power amplification.

BRIEF SUMMARY OF THE INVENTION

The invention is an improvement in a switching amplifier having a controlled variable, $v_p$, as a switched voltage signal. The improvement comprises an averaging circuit for generating an average value of the controlled variable, $v_p$, over a single switched cycle. A comparator circuit is coupled to the averaging circuit for comparing an average of the controlled variable, $v_p$, to a reference signal, $v_{ref}$, to be amplified. The comparator circuit generates an output signal when the average of the controlled variable, $v_p$, equals the reference signal, $v_{ref}$. The comparator circuit is coupled to the switching amplifier to switch the amplifier when the averaged controlled variable vp equals the reference signal, $v_{ref}$. As a result, DC-to-AC conversion is obtained with very linear gain, no crossover distortion, low harmonic distortion, excellent power source ripple rejection capability, large dynamic range, and wide bandwidth.

The averaging circuit is an integrator. The integrator is reset by output from the comparator circuit. The comparator circuit comprises a comparator having one input coupled to the integrator and a second input coupled to the reference signal, $v_{ref}$. A clock-driven flip-flop is coupled to and reset by the comparator. The flip-flop provides a driving signal to the switching amplifier. The flip-flop has an output coupled to the integrator to reset the integrator to zero when the average value of $v_p$ reaches the control reference. The comparator circuit further comprises a narrow pulse generator. The flip-flop is coupled to the integrator through the narrow pulse generator so that the narrow pulse generator is triggered by the flip-flop, and quickly resets the integrator to zero when the average value of $v_p$ reaches the control reference.

The switching amplifier further comprises a driver and a pair of complementarily driven switches coupled to the driver. The flip-flop has an output coupled to the driver to complementarily drive the switches of the switching amplifier.

In another embodiment the improvement further comprising an offset circuit for adding a predetermined offset voltage, $v_{os}$, to the averaged controlled variable, $v_p$, to couple a sum of the voltage to the comparator circuit to thereby avoid subharmonic oscillations of the switching amplifier.

The offset voltage, $v_{os}$, may be chosen to have a magnitude of a predetermined value in relationship to an DC power supply to the switching amplifier so that transients caused by perturbations on the average of the controlled variable, $v_p$, are forced to zero within one switching cycle.

In one embodiment the DC power supply provided to the switching amplifier is a half-wave bridge. The offset voltage $v_{os}$ is equal to half the DC voltage across the half bridge or full bridge power amplifiers.

The improvement further comprises a fast zero reset circuit for resetting the integrator during a time interval substantially smaller than the switching time of the switches of the switching amplifier.

The fast zero reset circuit comprises a pair of closely matched integrating capacitors coupled with said integrator. A switching network is coupled to the capacitors for coupling the pair of capacitors to the integrator in one of two configurations. A logic circuit controls the switching network to selectively couple the capacitors in one of the two configurations to selectively discharge those of the two capacitors coupled to the integrator.

In one embodiment the switching network comprises a pair of in-line switches and a pair of parallel switches for discharging the pair of integrating capacitors. The logic circuit drives the in-line switches and parallel switches in alternative pairs to alternately discharge one of the pair of capacitors and to couple the other one of the pair of capacitors in circuit with the integrator on each switching cycle.

In another embodiment the switching network cyclically couples one of the two capacitors alternatively in forward and then in reverse parallel circuit with the other one of the two capacitors to selectively discharge the two capacitors whenever the cyclically coupled capacitor is switched.

The invention is also defined as a method for controlling a switching power amplifier comprising the steps of averaging a controlled switched variable, $v_p$, output by the switching power amplifier. The averaged controlled switched variable, $v_p$, is compared to an input reference signal, $v_{ref}$. The switching power amplifier is switched at a rate so that the averaged controlled switched variable, $v_p$, substantially equals the reference signal, $v_{ref}$. As a result, the switching power amplifier is controlled to exhibit substantially linear gain, no crossover distortion, low harmonic distortion excellent power source ripple rejection, large dynamic range, and wide bandwidth.

The method further comprises the step of offsetting the averaged controlled variable, $v_p$, to avoid subharmonic oscillation within the switching power amplifier. The controlled switched variable, $v_p$, is averaged by an integrator and further comprising resetting the integrator to zero at a switching speed substantially faster than the switching speed of the switches of the switching power amplifier.

The invention may be better visualized by now turning to the following drawings wherein like elements are referenced by like numerals.

The invention and its various embodiments may now be better understood by turning to the following detailed description of the illustrated embodiment.

DETAILED DESCRIPTION OF THE PREFERRED EMBODIMENTS

A one cycle control for controlling DC-to-AC switching converters is achieved by forcing the average of a controlled switched variable to be exactly equal to the control reference in each switching cycle. Potential instability in a switching power amplifier which occurs in the DC-to-AC application of this method is prevented by adding an offset voltage to the averaged controlled switched variable which is fed back and compared to a control reference, which compares and is then used to switch the switching power amplifier. Switching errors are automatically corrected in the process which averages the controlled switched variable and reset in a time interval at least an order or magnitude less or faster than the switching speed of the switches in the switching power amplifier.

The basic concept of one cycle control is to force the average of the controlled switched-variable to be exactly equal to the control reference in each switching cycle. This concept is extended to control DC-to-AC conversion. For the purposes of illustration only, a half bridge converter is described below to clarify the extension of this control technique.

Figure 1:
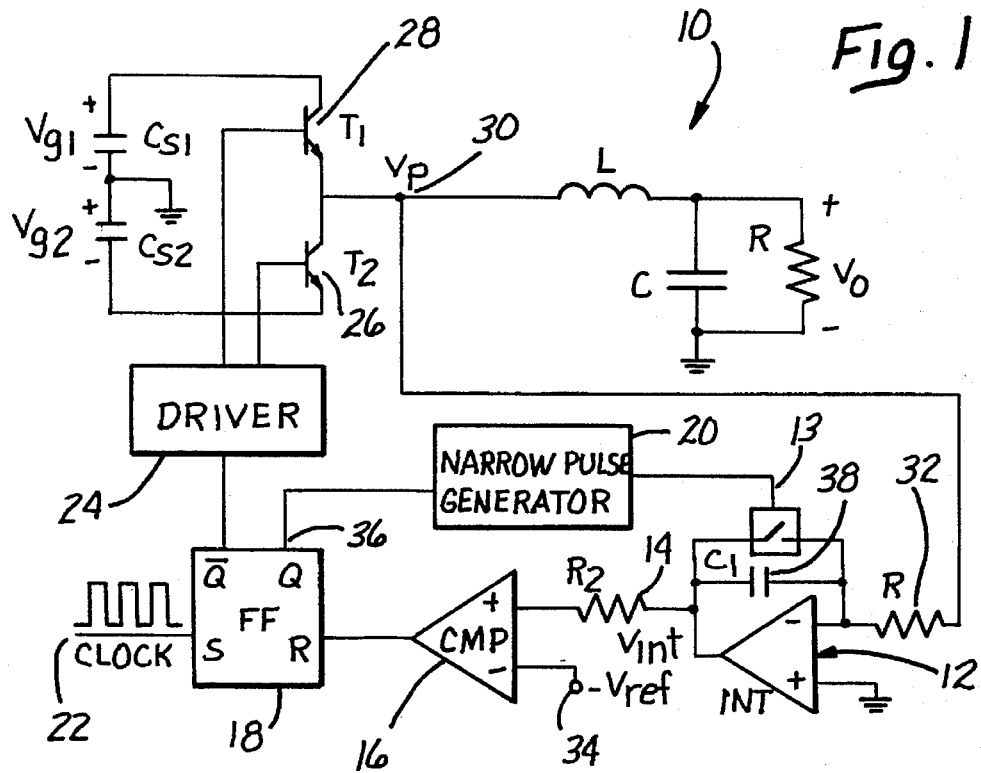
FIG. 1 is simplified block diagram of a switching power amplifier using the one cycle control of bipolar converters of the invention.

FIG. 1 is conceptual block diagram of one cycle control of the invention. The controller, generally denoted by reference numeral 10, comprises an integrator circuit, generally denoted by reference numeral 12, having a reset terminal 13. Integrator circuit 12 has its output coupled through a resistor 14 to a comparator 16. The output of comparator 16, in turn, is coupled to the reset input, R, of a clocked RS flip-flop 18. The Q output of flip-flop 18 is coupled through a narrow pulse generator 20 back to the reset input 13 of integrator circuit 12. RS flip-flop 18 is set, driving Q to logical 1, when a clock pulse arrives on clock input 22. The Q* output of RS flip-flop 18 is coupled to a driver 24, which in turn is coupled to the control gates of switches 26 and 28. The arrival of a clock pulse at input 22 turns on switch 26 and turns off switch 28. In this switching state, a controlled variable, $v_p$, at the output node 30 of switches 26 and 28 equals the negative power source voltage, i.e. $v_p=-v_{g2}$. Node 30 is then coupled back through resistor 32 and to the input of integrator circuit 12. Inverted integrator circuit 12 begins to integrate $v_p$ and the output of the integrator, $v_{int}$, increases monotonically from its initial value.

When the output of integrator circuit 12, $v_{int}$, reaches the control reference, $v_{ref}$, which is the signal to be amplified and which is provided on node 34 from a signal source (not shown), a reset pulse is generated at the output of comparator 16 that resets flip-flop 18, driving Q to a logical 0, and starting another switching state. Switch 28 is then turned on and switch 26 turned off as a consequence. The falling edge of the pulse at the Q output 36 triggers narrow pulse generator 20 to produce a very narrow pulse to reset integrator circuit 12. Integrator circuit 12 restarts the integration from a zero voltage after the reset. During the switching state, the controlled switched variable, $v_p$, equals the positive power source voltage, i.e. $v_p=+v_{g1}$. Therefore, $v_{int}$ keeps decreasing until the arrival of the next clock pulse which starts a new switching cycle.

Figure 2:
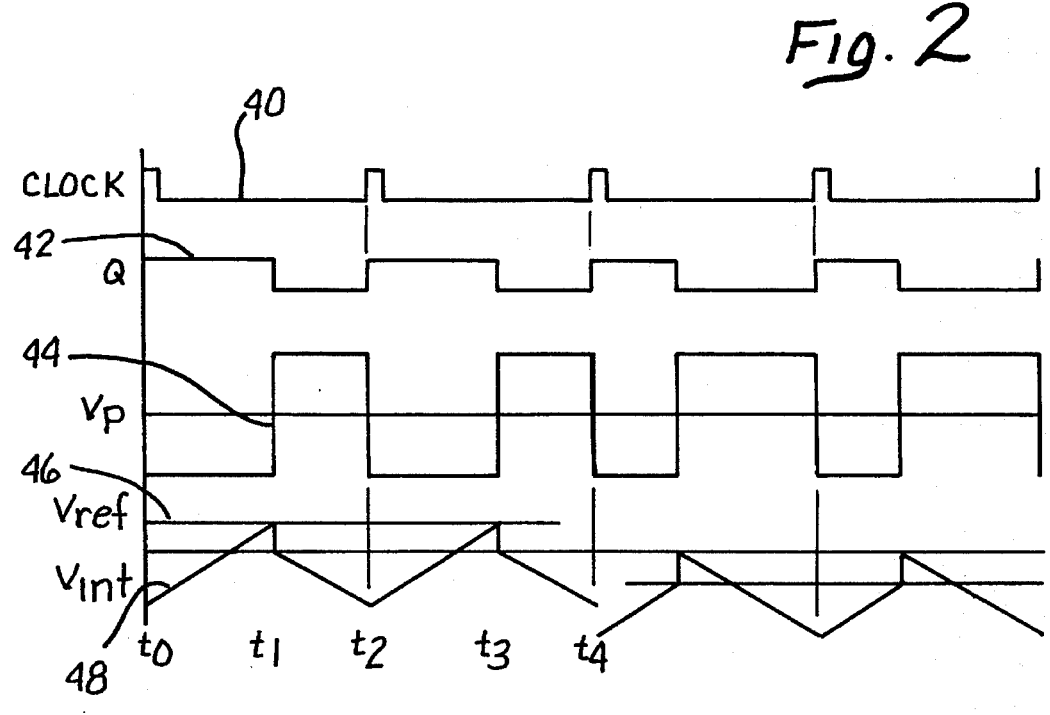
FIG. 2 is a wave diagram of the operation of selected signals of the circuit of FIG. 1.

FIG. 2 is a waveform diagram of the clock pulse on input 22 shown on line 40, the Q output 36 as shown on line 42, the controlled variable $v_p$ on node 30 as shown on line 44, $v_{ref}$ on node 34 as shown on line 46, and $v_{int}$ at the output of integrator circuit 12 as shown on line 48. As a simple example, FIG. 2 illustrates the waveform of the circuit of FIG. 1 for two steady states when the control reference $v_{ref}$ on node 34 is positive and negative respectively. The average value of the controlled switched variable, $v_p$, is proportional to $v_{ref}$ during the time interval from $t_1$ to $t_3$ as shown in FIG. 2. In a steady state, the duration of the time interval from $t_1$ to $t_2$ is equal to the duration of the time interval from $t_3$ to $t_4$ in the next cycle when $v_{ref}$ changes. Therefore, the average value of $v_p$ is also proportional to $v_{ref}$ during that cycle in which switching occurs. Since the averaging operation repeats cycle-by-cycle, the average value of $v_p$ is proportional to $v_{ref}$ in every switching cycle. The control law can be modeled by the following equation:

$$\int_{t_1}^{t_2} v_p/R_{32}C_{38}\, dt = v_{ref} \tag{1}$$

Where $R_{32}$ and $C_{38}$ are the values of resistor 32 and capacitor 38 in integrator circuit 12 shown in FIG. 1. Thus, the local average of $v_p$ is given by equation 2.

$$<v_p> = 1/T_S \int_0^{T_s} v_p\, dt = kv_{ref} \tag{2}$$

Where $R_{32}C_{38}/T_s=k$ and $T_s$ is a switching period. The constant k is also the voltage gain from $v_{ref}$ to $v_p$.

When $v_{ref}$ is a large AC signal, there is no DC steady state and hence the time interval from $t_1$ to $t_2$ is not necessarily equal to that interval between $t_3$ and $t_4$ in FIG. 2. However, when the frequency of $v_{ref}$ is well below the switching frequency of the circuit of FIG. 1, which is typically the case, the $t_2$–$t_1$ interval is very close to the $t_4$–$t_3$ interval of the neighboring cycle. Therefore, the control technique is effective. The same one cycle control can be applied to any bipolar switching converters, such as half bridge, full bridge or four quadrant Cuk converters and other converters known in the art.

Figure 3:
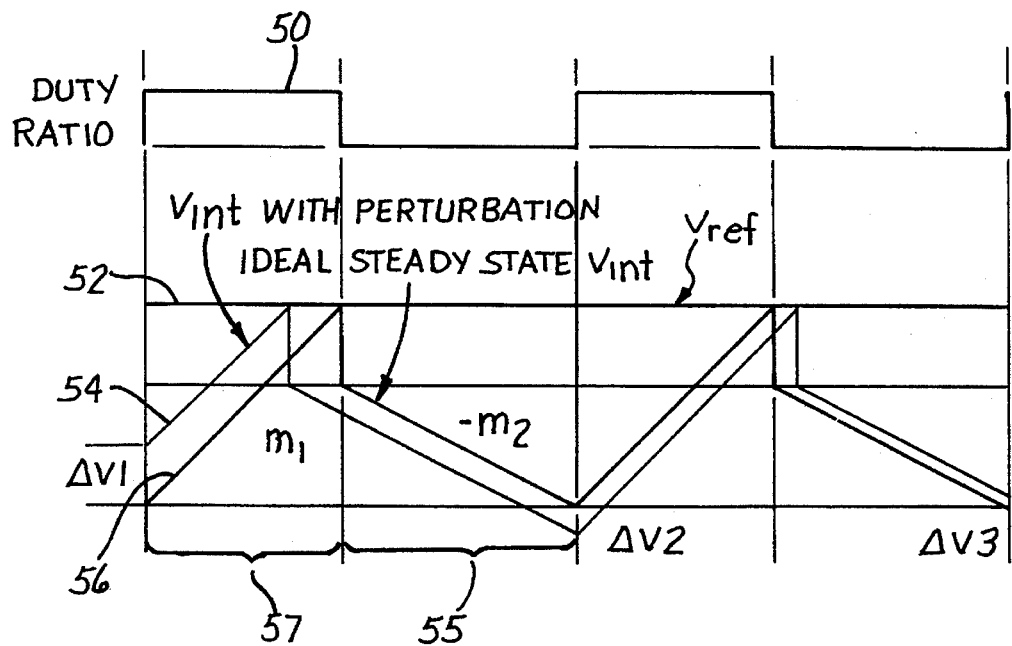
FIG. 3 is a wave diagram of the operation of selected signals of the circuit of FIG. 1 when a perturbation is present illustrating the possibility of instability.

The one cycle control of switching converters as shown in FIG. 1, however, has an instability problem under certain operating conditions which is illustrated in connection with the wave diagram of FIG. 3. When the output of the integrator, $v_{int}$, reaches the control reference value, $v_{ref}$, the state of the power switches 26 and 28 are changed and the integrator is reset. Therefore, $v_{int}$ restarts from zero. For simplicity, assume the power source voltage is constant during one switching period so that $v_{int}$ can be represented by straight lines as shown in waveform diagram of FIG. 3 which illustrates the duty ratio on line 50, $v_{ref}$ on line 52, $v_{int}$ with a perturbation on line 53 and ideal steady state for $v_{int}$ on line 56.

Suppose $v_{int}$ has a rising slope $m_1$ in a first interval 57 and a falling slope in a second interval 55 when at steady state. These slopes are then given by equations 3 and 4 below:

$$m_1 v_{g2}/R_{32}C_{38} \quad (3)$$

$$M_2 = v_{g1}/R_{32}C_{32} \quad (4)$$

Since the steady state waveform is periodic, the initial value of $v_{int}$ should be the same for each switching cycle in the ideal case. However, if there is a perturbation $v_1$ in $v_{int}$ at the beginning of a cycle, the error becomes $v_2$ at the beginning of the next cycle where the error is given by equation 5:

$$v_2 = (-m_2/m_1)v_1 \quad (5)$$

Thus at the beginning of the nth cycle, the perturbation will be $v_n$ given by equation 6.

$$v_n = (-m_2/m_1)^{n-1} v_1 \quad (6)$$

If the ratio of the slopes $m_2$ to $m_1$ is greater than or equal to 1, the circuit will not be stable and a subharmonic oscillation at half the switching frequency will occur. In a half bridge converter, $v_{g1} = v_{g2}$ so that the ratio of the slopes $m_1/m_2$ is equal to 1 and the system will oscillate.

Figure 4:
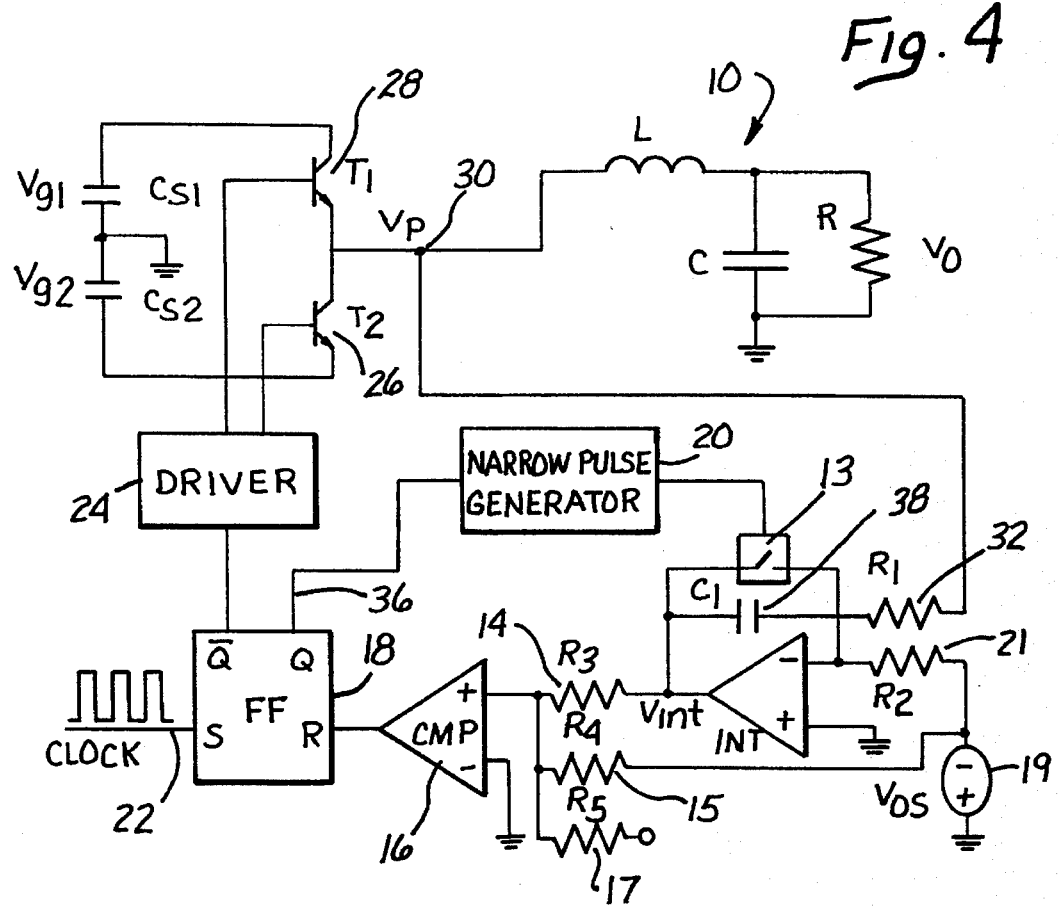
FIG. 4 is simplified block diagram of a switching power amplifier similar to FIG. 1 in which modifications have been made to avoid the instability of FIG. 3.
Figure 5:
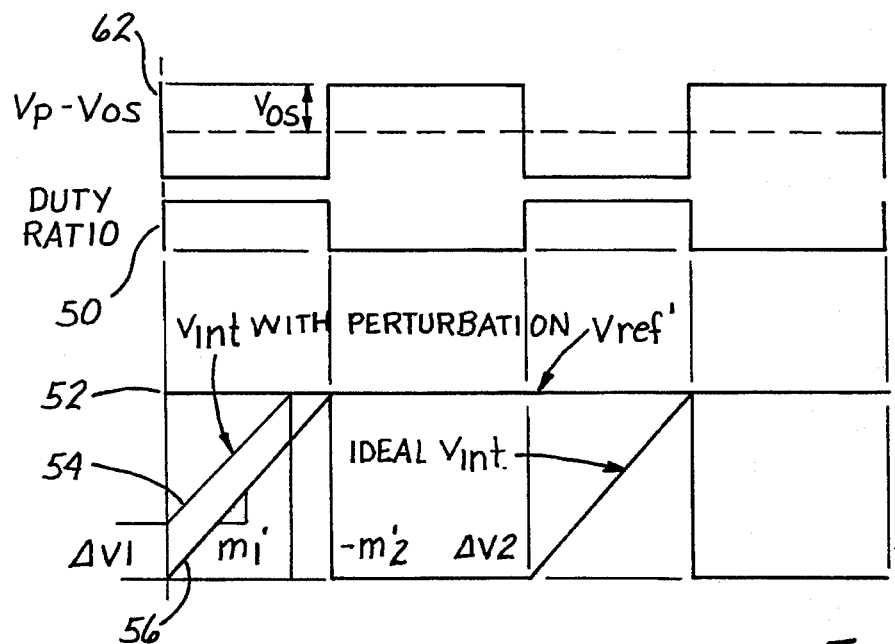
FIG. 5 is a wave diagram of the operation of selected signals of the circuit of FIG. 4 when a perturbation is present illustrating how the instability has been avoided.

An offset method is proposed according to the invention to stabilize the system in one switching cycle as illustrated in FIG. 4 which is a simplified block diagram similar to that shown in FIG. 1 with the exception that the input to comparator 16 has been modified to include an offset voltage, $v_{os}$. The offset voltage $v_{os}$ is generated by a voltage source 19 and summed at the input to the integrator through resistor 21 with the controlled switched variable $v_p$ and added through resistor 15 with $v_{int}$ with $v_{ref}$ added through resistor 17. Therefore, the rising slope of $v_{int}$ becomes $m_{1'}$, and the falling slope becomes $m_{2'}$ as illustrated in FIG. 5 with the slopes for $m_{1'}$ and $m_{2'}$ are given by equation 7. The ratio of $m'_2/m'_1$ is now always less than one and the oscillation due to any perturbation in $v_{int}$ is suppressed.

$$m'_1 = v_{g2}/R_{32}C_{38} + v_{os}/R_{21}C_{38} \quad (7)$$

$$m'_2 = v_{g1}/R_{32}C_{38} - v_{os}/R_{21}C_{38}$$

FIG. 5 is a wave diagram showing on line 62 the difference between $v_p$ and offset voltages $v_{os}$ in addition to the lines 50–56 described in connection with FIG. 3. Since $m_1'$, is greater than $m_2'$, the circuit will be stable.

As a by-product of the offset voltage $v_{os}$, the controlled switched variable $v_p$ does not follow the control reference $v_{ref}$ in accordance with equation 2, but is modeled by equation 8 set forth below.

$$(v_p/R_{32}C_{38} - v_{os}R_{21}C_{38})dt = v_{ref} \quad (8)$$

Equation 9 can be rewritten below as equation (9) giving a relationship between $v_p$, $v_{ref}$ and $v_{os}$ where k again is the same constant as used in equation 2

$$<v_p> = 1/T_S \int_0^{T_S} v_p \, dt = k v_{ref} + (R_{32}/R_{21}) v_{OS} \quad (9)$$

Equation 9, as a model, shows that by adding an offset voltage to both the control reference voltage $v_{ref}$ and the feedback voltage $v_p$, instability is solved without an offset on $v_p$. If the offset voltage $v_{os}$ is selected to be equal to $v_{g1}$, then the slope $m_2'$, can be set to zero, so that the transient caused by the perturbation disappears within one switching cycle as graphically illustrated in FIG. 5.

Figure 6:
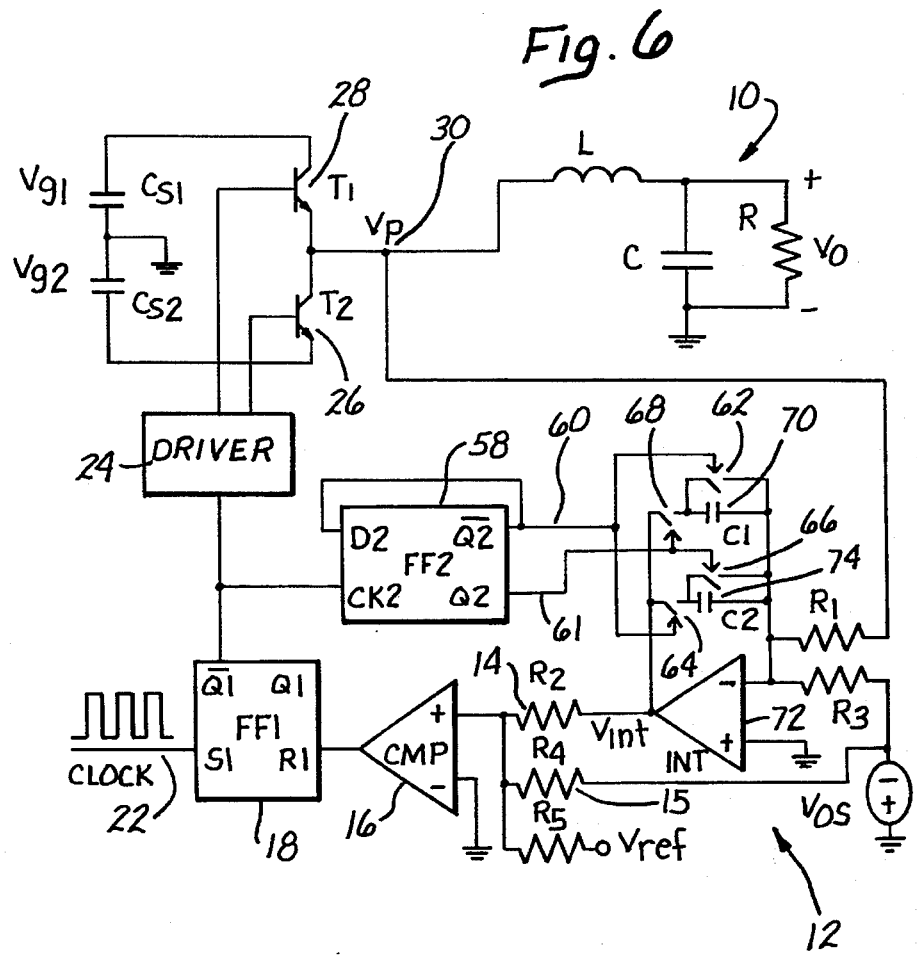
FIG. 6 is simplified block diagram of a switching power amplifier similar to FIGS. 1 and 4 which has been further modified to avoid finite-time switching errors in the integrator.

In reality, it is not possible to reset integrator circuit 12 instantaneously, so the possibility of a finite reset time could cause some control error. FIG. 6 shows one solution wherein the block diagram circuit of FIG. 4 has been modified by using two capacitors and two switches in the reset portion of integrator circuit 12. The feedback to integrator circuit 12 from flip-flop 18 is provided from the Q* output of flip-flop 18 into the clock terminal of a D type flip-flop 58. The Q* output 60 of flip-flop 58 is used to drive switches 62 and 64 while the Q output 61 of flip-flop 58 alternatively drives switches 66 and 68. In one cycle, capacitor 70 is connected to operational amplifier 72 of integrator circuit 12 to form a conventional integrator while capacitor 74 is disconnected from amplifier 72 and short circuited by switch 66 and discharged. In the next cycle, which is initiated by a reset pulse, capacitor 70 is short circuited by switch 62 and discharged and capacitor 74 connected into circuit with amplifier 72 to act as part of integrator circuit 12.

Since the time constants of the capacitance of the capacitor and resistance of the switch is much smaller than the switching period, capacitors 70 and 74 are discharged completely before they are reconnected to the operational amplifier. The switching time of the capacitor switches 62, 64, 66 and 68 is much smaller, i.e. about 20 nanoseconds, than that of the power switches, which is about 200 nanoseconds. Thus, the error caused by the delay of the capacitor switches is negligible. With these improvements, a one cycle control method can reject the power source ripple and correct the switching error in every switching cycle.

Figure 7:
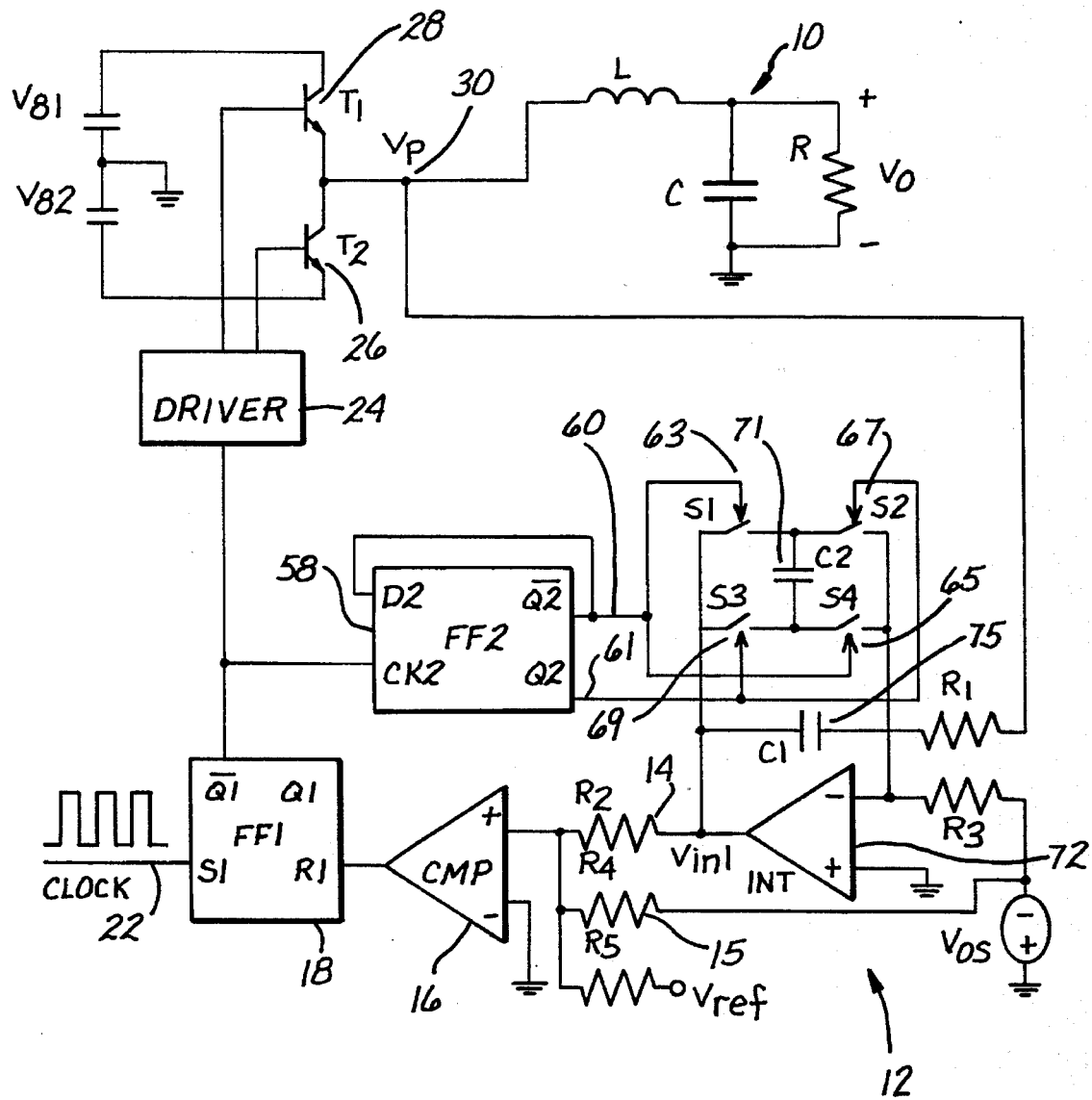
FIG. 7 is another embodiment of the reset circuit which does not require precisely matching capacitors.

FIG. 7 is a schematic of another embodiment where the matching of capacitors is avoided. Capacitor 75 and 71 have approximately the same value. Capacitor 75 is connected to the output and the inverting input all the time, while capacitor 71 is switched to the forward direction in one cycle and the reverse direction in another cycle in parallel with capacitor 75 by means of switches 63 and 65 driven by the Q2* output 60 of flip-flop 58 and by means of switches 67 and 69 driven by the Q2 output 61 of flip-flop 58. Both capacitors 71 and 75 are coupled to $v_p$ which is the charging voltage. When Q2 is a logical one, switch 67 and 69 are turned on and switches 63 and 65 are turned off. As a result, capacitor 71 is coupled in parallel in a forward direction to capacitor 75. When Q2 is a logical zero, the reverse is true and capacitor 71 is then coupled in parallel in a reverse direction to capacitor 75. Whenever capacitor 71 is switched to a new direction, the charge in capacitor 75 is cancelled with the charge in capacitor 71 and therefore instant reset is achieved. In this mechanism the capacitors 71 and 75 need not be accurately matched. Hence the circuit is suitable for mass production for one-cycle controlled power amplifiers.

An experimental amplifier devised according to the invention as described above was built and operated with a switching frequency of 65 kHz at a voltage gain of 6. The linearity of the gain was experimentally measured and found to have a linearity correlation coefficient of 0.999939.

A pair of rectified, but unregulated, power sources were applied to the inputs of the switching amplifier in the place of $v_{g1}$ and $v_{g2}$ in FIG. 1. The measured waveforms of the power sources in the output amplifier were experimentally observed. The power source voltage had large ripple, but the output of the power amplifier had very low distortion. The observed total harmonic distortion was measured to be less than 0.25 percent in the experimental circuit from 50 Hz to 3 kHz. The line frequency component and its harmonics were not observed. The dynamic range of the output was observed to be as large as the power source would allow, that is the output voltage level could be as high as that of the power source.

Ripple rejection capability was then measured using a swept sinusoidal signal from 50 Hz up to haft the switching frequency of 32.5 kHz while the control reference is set to zero. At low frequencies, the ratio of the output voltage to the ripple voltage was −46 dB. The rejection rolls up as a frequency increases, due to the fact that the devices used in the circuit are non-ideal and due to a wire-wrapped layout. At about 3 kHz, the ripple rejection started to roll off at a slope of −20 dB per decade. The rolling-off effect was caused by the output low pass filter on the switching amplifier. The transfer function of the power amplifier from $v_{ref}$ to $v_p$ was measured using a swept sinusoidal control reference $v_{ref}$ at constant amplitude. The transfer function is fairly flat except for some glitches near the half switching frequency due to the aliasing of the measurement. One cycle control of the invention made the nonlinear switching power stage behave as if it were a linear, all-pass filter.

The transfer function of the power amplifier from $v_{ref}$ to $v_o$ was also measured with a swept sinusoidal control reference $v_{ref}$ at constant amplitude. Transfer function was primarily determined by the output low pass filter, and therefore, it was approximately a second order system except for some glitches near the half switching frequency due to aliasing of the measurement. It can be anticipated that a wider bandwidth can be achieved by properly selecting the parameters of the output low pass filter.

As confirmed by the experimental test, one cycle control has excellent features compared to other control methods, especially for large signal amplification. Empirical results demonstrate that one cycle controlled switching power amplifiers have a very linear gain, no crossover distortion, low harmonic distortion, excellent power ripple source rejection capability, large dynamic range and a wide bandwidth. Power amplifiers using the design of the invention do not require precision and stable power sources. Instead, a rectified and unregulated power source with a small low pass filter is sufficient to power the amplifier as verified in the experiments discussed above. The linearity, distortion, ripple rejection capability can be anticipated as further improved if an output feedback loop is included. In conclusion, one cycle control of switching power amplifiers is well suited to high fidelity audio power amplification.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following claims.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result.

In addition to the equivalents of the claimed elements, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the invention.

We claim:

1. An improvement in a bipolar switching amplifier having a controlled switched bipolar variable, $v_p$, as a switched voltage signal comprising:

an averaging circuit for generating an average value of said controlled bipolar variable, $v_p$, over a single switched cycle;

a comparator circuit coupled to said averaging circuit for comparing said average of said controlled bipolar variable, $v_p$, to a reference signal, $v_{ref}$, to be amplified, said comparator circuit generating an output signal when said average of said controlled bipolar variable, $v_p$, equals said reference signal, $v_{ref}$, said comparator circuit being coupled to said switching amplifier to switch said amplifier when said average of said controlled variable $v_p$ is equal to or proportional to said reference signal $v_{ref}$, and an offset circuit for adding a predetermined offset voltage $v_{os}$, to said average of said controlled bipolar variable $v_p$, to couple a sum of said voltage to said comparator circuit to thereby avoid subharmonic oscillations of said bipolar switching amplifier, whereby DC-to-AC conversion is obtained with very linear gain, no crossover distortion, low harmonic distortion, excellent power source ripple rejection capability, large dynamic range, and wide bandwidth.

2. The improvement of claim 1 wherein said averaging circuit is an integrator, said integrator being reset by output from said comparator circuit wherein said comparator circuit comprises:
a comparator having one input coupled to said integrator and a second input coupled to said reference signal, $v_{ref}$; and
a clock-driven flip-flop being coupled to and reset by said comparator, said flip-flop providing a driving signal to said switching amplifier;

wherein said bipolar switching amplifier further comprises a driver and a pair of complementarily driven switches coupled to said driver, said flip-flop having an output coupled to said driver to complementarily drive said switches of said bipolar switching amplifier.

3. An improvement in a switching amplifier having a controlled switched variable, $v_p$, as a switched voltage signal comprising:

an averaging circuit for generating an average value of said controlled variable, $v_p$, over a single switched cycle; and a comparator circuit coupled to said averaging circuit for comparing said average of said controlled variable, $v_p$, to a reference signal, $v_{ref}$, to be amplified, said comparator circuit generating an output signal when said average of said controlled variable, $v_p$, equals said reference signal, $v_{ref}$, said comparator circuit being coupled to said switching amplifier to switch said amplifier when said average of said controlled variable $v_p$ is equal to or proportional to said reference signal $v_{ref}$, wherein said averaging circuit is an integrator, said integrator being reset by output from said comparator circuit wherein said comparator circuit comprises:

a comparator having one input coupled to said integrator and a second input coupled to said reference signal, $v_{ref}$; and a clock-driven flip-flop being coupled to and reset by said comparator, said flip-flop providing a driving signal to said switching amplifier;

wherein said flip-flop has an output coupled to said integrator to reset said integrator to zero when the average value of said switched variable, $v_p$, reaches said control reference signal, $v_{ref}$;

wherein said comparator circuit further comprises a narrow pulse generator and said flip-flop is coupled to said integrator through said narrow pulse generator so that said narrow pulse generator, being triggered by said flip-flop, quickly resets said integrator to zero when the average value of said switched variable, $v_p$, reaches said control reference signal, $v_{ref}$, whereby DC-to-AC conversion is obtained with very linear gain, no crossover distortion, low harmonic distortion, excellent power source ripple rejection capability, large dynamic range, and wide bandwidth.

4. The improvement of claim 3 further comprising an offset circuit for adding a predetermined offset voltage, $v_{os}$, to said average of said controlled variable, $v_p$, to couple a sum of said voltage to said comparator circuit to thereby avoid subharmonic oscillations of said switching amplifier.

5. An improvement in a switching amplifier having a controlled switched variable, $v_p$, as a switched voltage signal comprising:

an averaging circuit for generating an average value of said controlled variable, $v_p$, over a single switched cycle; and a comparator circuit coupled to said averaging circuit for comparing said average of said controlled variable, $v_p$, to a reference signal, $v_{ref}$, to be amplified, said comparator circuit generating an output signal when said average of said controlled variable, $v_p$, equals said reference signal, $v_{ref}$, said comparator circuit being coupled to said switching amplifier to switch said amplifier when said average of said controlled variable $v_p$ is equal to or proportional to said reference signal $v_{ref}$, wherein said averaging circuit is an integrator, said integrator being reset by output from said comparator circuit; and further comprising an offset circuit for adding a predetermined offset voltage, $v_{os}$, to said average of said controlled variable, $v_p$, to couple a sum of said voltage to said comparator circuit to thereby avoid subharmonic oscillations of said switching amplifier, whereby DC-to-AC conversion is obtained with very linear gain, no crossover distortion, low harmonic distortion, excellent power source ripple rejection capability, large dynamic range, and wide bandwidth.

6. The improvement of claim 5 further comprising a fast zero reset circuit for resetting said integrator during a time interval smaller than said switching time of the switches in said switching amplifier.

7. An improvement in a switching amplifier having a controlled switched variable, $v_p$, as a switched voltage signal comprising:

an averaging circuit for generating an average value of said controlled variable, $v_p$, over a single switched cycle; and a comparator circuit coupled to said averaging circuit for comparing said average of said controlled variable, $v_p$, to a reference signal, $v_{ref}$, to be amplified, said comparator circuit generating an output signal when said average of said controlled variable, $v_p$, equals said reference signal, $v_{ref}$, said comparator circuit being coupled to said switching amplifier to switch said amplifier when said average of said controlled variable $v_p$ is equal to or proportional to said reference signal $v_{ref}$, wherein said averaging circuit is an integrator, said integrator being reset by output from said comparator circuit wherein said comparator circuit comprises:

a comparator having one input coupled to said integrator and a second input coupled to said reference signal, $v_{ref}$; and a clock-driven flip-flop being coupled to and reset by said comparator, said flip-flop providing a driving signal to said switching amplifier;

wherein said switching amplifier further comprises a driver and a pair of complementarily driven switches coupled to said driver, said flip-flop having an output coupled to said driver to complementarily drive said switches of said switching amplifier; and further comprising an offset circuit for adding a predetermined offset voltage, $v_{os}$, to said average of said controlled variable, $v_p$, to couple a sum of said voltage to said comparator circuit to thereby avoid subharmonic oscillations of said switching amplifier.

8. The improvement of claim 5 wherein said offset voltage, $v_{os}$, is chosen to have a magnitude of a predetermined value in relationship to an DC power supply to said switching amplifier so that transients caused by perturbations on said average of said controlled variable, $v_p$, are forced to zero within one switching cycle.

9. The improvement of claim 8 wherein said DC power supply provided to said switching amplifier is a half-wave bridge or full wave bridge, and wherein said offset voltage $v_{os}$ is equal to half the DC voltage across said half bridge or full bridge of said DC power supply.

10. An improvement in a switching amplifier having a controlled switchable variable, $v_p$, as a switched voltage signal comprising:

an averaging circuit for generating an average value of said controlled variable, $v_p$, over a single switched cycle; and a comparator circuit coupled to said averaging circuit for comparing said average of said controlled variable, $v_p$, to a reference signal, $v_{ref}$, to be amplified, said comparator circuit generating an output signal when said average of said controlled variable, $v_p$, equals said reference signal, $v_{ref}$, said comparator circuit being coupled to said switching amplifier to switch said amplifier when said average of said controlled variable $v_p$ is equal to proportional to said reference signal $v_{ref}$, wherein said averaging circuit is an integrator, said integrator being reset by output from said comparator circuit wherein said comparator circuit comprises:

a comparator having one input coupled to said integrator and a second input coupled to said reference signal, $v_{ref}$ and a clock-driven flip-flop being coupled to and reset by said comparator, said flip-flop providing a driving signal to said switching amplifier;

wherein said flip-flop has an output coupled to said integer to reset said integrator to zero when the average value of said switched variable, $v_p$, reaches said control reference signal, $v_{ref}$;

further comprising a fast zero reset circuit of resetting said integrator during a time interval at least an order of magnitude smaller than said switching time of the switches of the said switching amplifier.

11. The improvement of claim 10 wherein said fast zero reset circuit comprises:

a pair of integrating capacitors coupled with said integrator;

a switching network coupled to said capacitors for coupling said pair of capacitors to said integrator in one of two configurations; and a logic circuit for controlling said switching network to selectively couple said capacitors in one of said two configurations to selectively discharge those of said two capacitors coupled to said integrator.

12. The improvement of claim 11 where said switching network comprises a pair of in-line switches and a pair of parallel switches for discharging said pair of integrating capacitors; and wherein said logic circuit drives said in-line switches and parallel switches in alternative pairs to alternately discharge one of said pair of capacitors and to couple said other one of said pair of capacitors in circuit with said integrator on each switching cycle.

13. The improvement of claim 11 where said switching network cyclically couples one of said two capacitors alternatively in forward and then in reverse parallel circuit with said other one of said two capacitors to selectively discharge said other one of said two capacitors whenever said cyclically coupled capacitor is switched.

14. A method for controlling a bipolar switching power amplifier comprising:

averaging a controlled switched bipolar variable, $v_p$, output by said switching power amplifier;

comparing said average of said controlled switched bipolar variable to an input reference signal, $v_{ref}$ and switching said bipolar switching power amplifier at a rate so that said average of said controlled switched variable, $v_p$, substantially equals said reference signal, $v_{ref}$, offsetting said average of said controlled bipolar variable, $v_p$, to avoid instabilities within said bipolar switching power amplifier, whereby said bipolar switching power amplifier is controlled to exhibit substantially linear gain, no crossover distortion, low harmonic distortion, excellent power source ripple rejection, large dynamic range, and wide bandwidth.

15. A method for controlling a switching power amplifier comprising:

averaging a controlled switched variable, $v_p$, output by said switching power amplifier;

comparing said average of said controlled switched variable to an input reference signal, $v_{ref}$; and switching said switching power amplifier at a rate so that said average of said controlled switched variable, $v_p$, substantially equals said reference signal, $v_{ref}$, and wherein said controlled switched variable, $v_p$, is averaged by an integrator and further comprising resetting said integrator to zero at a speed substantially faster than said switching speed of the switches in said switching power amplifier, whereby said switching power amplifier is controlled to exhibit substantially linear gain, no crossover distortion, low harmonic distortion, excellent power source ripple rejection, large dynamic range, and wide bandwidth.

16. A method for controlling a switching power amplifier comprising:

averaging a controlled switched variable, $v_p$, output by said switching power amplifier;

comparing said average of said controlled switched variable to an input reference signal, $v_{ref}$; and switching said switching power amplifier at a rate so that said average of said controlled switched variable, $v_p$, substantially equals said reference signal, $v_{ref}$, offsetting said average of said controlled variable, $v_p$, to avoid instabilities within said switching power amplifier; and wherein said controlled switched variable, $v_p$, is averaged by an integrator and further comprising resetting said integrator to zero at a switching speed substantially faster than said switching speed of the switches of said switching power amplifier, whereby said switching power amplifier is controlled to exhibit substantially linear gain, no crossover distortion, low harmonic distortion, excellent power source ripple rejection, large dynamic range, and wide bandwidth.

17. An improvement in a bipolar switching amplifier having a controlled switched bipolar variable, $v_p$, as a bipolar switched voltage signal comprising:

an averaging circuit for generating an average value of said controlled bipolar variable, $v_p$, over a single switched cycle; and a comparator circuit coupled to said averaging circuit for comparing said average of said controlled bipolar variable, $v_p$, to a reference signal, $v_{ref}$, to be amplified, said comparator circuit generating an output signal when said average of said controlled bipolar variable, $v_p$, equals said reference signal, $v_{ref}$, said comparator circuit being coupled to said bipolar switching amplifier to switch said amplifier when said average of said controlled bipolar variable $v_p$ is equal to or proportional to said reference signal $v_{ref}$, wherein said comparator circuit further comprises a narrow pulse generator coupled to said averaging circuit so that said narrow pulse generator quickly resets said averaging circuit to zero when the average value of said switched bipolar variable, $v_p$, reaches said control reference signal, $v_{ref}$;

whereby DC-to-AC conversion is obtained with very linear gain, no crossover distortion, low harmonic distortion, excellent power source ripple rejection capability, large dynamic range, and wide bandwidth.

18. An improvement in a method of controlling a bipolar switching amplifier having a controlled switched bipolar variable, $v_p$, as a switched voltage signal comprising:

generating an average value of said controlled bipolar variable, $v_p$, over a single switched cycle; and comparing said average of said controlled bipolar variable, $v_p$, to a reference signal, $v_{ref}$, to be amplified;

generating an output signal when said average of said controlled bipolar variable, $v_p$, equals said reference signal, $v_{ref}$;

switching said bipolar switching amplifier when said average of said controlled bipolar variable $v_p$ is equal to or proportional to said reference signal $v_{ref}$, and quickly resetting said averaging circuit to zero with a narrow pulse generator when the average value of said switched bipolar variable, $v_p$, reaches said control reference signal, $v_{ref}$;

whereby DC-to-AC conversion is obtained with very linear gain, no crossover distortion, low harmonic distortion, excellent power source ripple rejection capability, large dynamic range, and wide bandwidth.

* * * * *